United States Patent
Hiterer et al.

[11] Patent Number: 5,907,201
[45] Date of Patent: May 25, 1999

[54] DISPLACER ASSEMBLY FOR STIRLING CYCLE SYSTEM

[75] Inventors: Misha Hiterer, Jerusalem; Mark Kushnir, Rehovot, both of Israel

[73] Assignee: Medis El Ltd., Jerusalem, Iceland

[21] Appl. No.: 08/980,623

[22] Filed: Dec. 1, 1997

Related U.S. Application Data

[63] Continuation-in-part of application No. 08/599,206, Feb. 9, 1996, Pat. No. 5,693,991.

[51] Int. Cl.⁶ .......................... H02K 33/12; F04B 35/04; F25B 9/14
[52] U.S. Cl. ................................. 310/30; 310/15; 62/6; 60/520
[58] Field of Search ................. 310/12, 13, 14, 310/15, 17, 30; 62/6; 60/520

[56] References Cited

U.S. PATENT DOCUMENTS

| | | | |
|---|---|---|---|
| 4,363,980 | 12/1982 | Petersen | 310/15 |
| 4,389,849 | 6/1983 | Gasser et al. | 62/6 |
| 4,397,155 | 8/1983 | Davey | 62/6 |
| 4,458,489 | 7/1984 | Walsh | 60/520 |
| 4,638,193 | 1/1987 | Jones | 310/15 |
| 4,862,695 | 9/1989 | Kushnir | 62/6 |
| 5,017,819 | 5/1991 | Patt et al. | 310/90.5 |
| 5,693,991 | 12/1997 | Hiterer et al. | 310/30 |

*Primary Examiner*—Nestor Ramirez
*Assistant Examiner*—Judson H. Jones
*Attorney, Agent, or Firm*—Mark M. Friedman

[57] ABSTRACT

A displacer assembly for a Stirling cycle system includes a displacer and a synchronous linear electric motor linked so as to drive the displacer. The electric motor features at least one stator assembly having first and second soft-magnetic pole pieces defining therebetween a gap. The width of the gap is oriented perpendicular to an axis of movement of the motor, and the stator assembly is constructed so as to generate a magnetic field aligned primarily parallel to the width of the gap. The motor also includes at least one compound permanent magnet system located within the gap. The compound permanent magnet system has a first section magnetized in a first direction parallel to the width of the gap and a second section axially displaced from the first section magnetized in a direction opposite to the first direction. The result of this structure is that the electric motor operates as a magnetic spring which, when no power is supplied to the motor, returns the displacer to a predefined rest position.

12 Claims, 10 Drawing Sheets

DISPLACER ASSEMBLY FOR STIRLING CYCLE SYSTEM

This application is a Continuation-In-Part of application Ser. No. 08/599,206 filed Feb. 9, 1996, issued on Dec. 2, 1997, as U.S. Pat. No. 5,693,991.

FIELD AND BACKGROUND OF THE INVENTION

The present invention relates to Stirling cycle machines and, in particular, it concerns Stirling cycle system having displacer driven by a synchronous linear motor with a magnetic spring.

It is known to employ Stirling cycle systems for cooling. Stirling cycle systems contain two essential moving parts, both of which execute reciprocating motion. One of these parts, usually known as the "displacer", is typically implemented as a plunger movable with clearance along a cylinder. This serves to transfer a mass of gas in alternate directions between the two ends of the cylinder. The displacer is connected to a compressor which generates pulsating pressure within the gas. By driving the displacer at the same frequency as the compressor, but at a certain phase difference therefrom, the system operates as a heat pump with heat being removed from one end of the displacer. In this manner, Stirling cycle systems can be used as the basis for a range of refrigeration systems.

In order to maintain efficient operation of a Stirling cycle system, the phase relationship between the compressor and the displacer must be optimized. The phase relation is most commonly maintained by a mechanical linkage between the compressor and displacer. However, it is very difficult to make such a linkage so as to allow adjustment of either the phase relation or the amplitude. In addition, a mechanical linkage tends to transmit vibration between the two parts of the system, rendering both the linkage itself and the system as a whole unreliable.

An alternative approach is a split structure employing a "passive" displacer assembly in which the displacer acts as a free piston. By designing the displacer assembly to achieve the right natural frequencies of oscillation, the displacer responds to the compressor output with movements that show the right difference in phase from those of the compressor itself. Calibration and adjustment of passive displacer systems, however, are difficult to achieve. An example of such a system is U.S. Pat. No. 4,862,695 to Kushnir in which a complicated three-spring damping mechanism is provided to allow adjustment of the displacer movement.

In an attempt to achieve improved control without the disadvantages of a mechanical linkage, U.S. Pat. No. 4,397,155 to Davey describes a Stirling cycle machine with an "active" displacer assembly in which the relationship between the movements of the displacer and the compressor is controlled by an independent electromagnetic device, in one embodiment functioning as a motor. The motor includes a coil carried by the displacer plunger and movable within the field of a stationary magnet.

The Davey machine has a number of advantages. However, the efficiency of the system is severely limited by the motor structure employed. Specifically, the motor is shown as a single cylindrical coil moving axially within the cylindrical gap of a permanent magnet circuit. The motor structure described provides low efficiency and has no self-centering properties. Such a system also requires sliding contacts which are unreliable.

Furthermore, the displacer of the Davey machine, in common with all other Stirling displacers, requires various spring elements to return the displacer to its neutral position. Such mechanical spring elements present numerous design problems, being difficult to adjust, intensifying mechanical wear, and increasing acoustic noise.

There is therefore a need for a Stirling cycle system having a motor driven displacer which has a magnetic spring effect without the need for mechanical contact. It would also be advantageous to have a Stirling cycle system which includes such a displacer.

SUMMARY OF THE INVENTION

The present invention is a Stirling cycle displacer driven by a synchronous linear motor with a magnetic spring, and a Stirling cycle system including the same.

According to the teachings of the present invention there is provided, a displacer assembly for a Stirling cycle system comprising: (a) a displacer; and (b) a synchronous linear electric motor operatively connected so as to drive the displacer, the electric motor having an axis of movement, the electric motor including: (i) at least one stator assembly having first and second soft-magnetic pole pieces defining therebetween a gap, a width of the gap being oriented perpendicular to the axis, the stator assembly being constructed so as to generate a magnetic field aligned primarily parallel to the width of the gap, and (ii) at least one compound permanent magnet system located within the gap, the compound permanent magnet system including a first section magnetized in a first direction parallel to the width of the gap and a second section axially displaced from the first section magnetized in a direction opposite to the first direction, the electric motor operating as a magnetic spring which, when no power is supplied to the motor, returns the displacer to a predefined rest position.

According to a further feature of the present invention, the stator assembly includes a coil, variation of a voltage applied to the coil resulting in a corresponding variation in an axial force between the stator assembly and the compound permanent magnet system.

There is also provided according to the teachings of the present invention, a Stirling cycle system comprising: (a) a compressor; (b) a displacer; and (c) a synchronous linear electric motor operatively connected so as to drive the displacer, wherein the electric motor is constructed so as to provide a magnetic spring such that, when no power is supplied to the motor, the displacer returns to a predefined rest position.

According to a further feature of the present invention, the electric motor has an axis of movement, the electric motor including: (a) at least one stator assembly having first and second soft-magnetic pole pieces defining therebetween a gap, a width of the gap being oriented perpendicular to the axis, the stator assembly being constructed so as to generate a magnetic field aligned primarily parallel to the width of the gap; and (b) at least one compound permanent magnet system located within the gap, the compound permanent magnet system including a first section magnetized in a first direction parallel to the width of the gap and a second section axially displaced from the first section magnetized in a direction opposite to the first direction.

According to a further feature of the present invention, the compressor includes at least one synchronous linear electric motor, referred to as the "compressor motor", the compressor motor being constructed so as to provide a magnetic spring such that, when no power is supplied to the compressor motor, the compressor returns to a predefined rest state.

According to a further feature of the present invention, the compressor motor includes: (a) at least one stator assembly having first and second soft-magnetic pole pieces defining therebetween a gap, a width of the gap being oriented perpendicular to the axis of movement of the motor, the stator assembly being constructed so as to generate a magnetic field aligned primarily parallel to the width of the gap; and (b) at least one compound permanent magnet system located within the gap, the compound permanent magnet system including a first section magnetized in a first direction parallel to the width of the gap and a second section axially displaced from the first section magnetized in a direction opposite to the first direction.

According to a further feature of the present invention, the compressor includes at least one synchronous electric motor, referred to as the "compressor motor", the system further comprising a voltage source, both the displacer motor and the compressor motor being operatively connected so as to be driven by the voltage source.

According to a further feature of the present invention, there is also provided at least one element with variable impedance connected between the voltage source and one of the displacer motor and the compressor motor for adjusting the relative phase between the compressor and the displacer.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a Stirling cycle displacer assembly driven by a synchronous linear motor with a magnetic spring, and a Stirling cycle system including the same.

The principles and operation of Stirling cycle devices according to the present invention may be better understood with reference to the drawings and the accompanying description.

Figure 1:
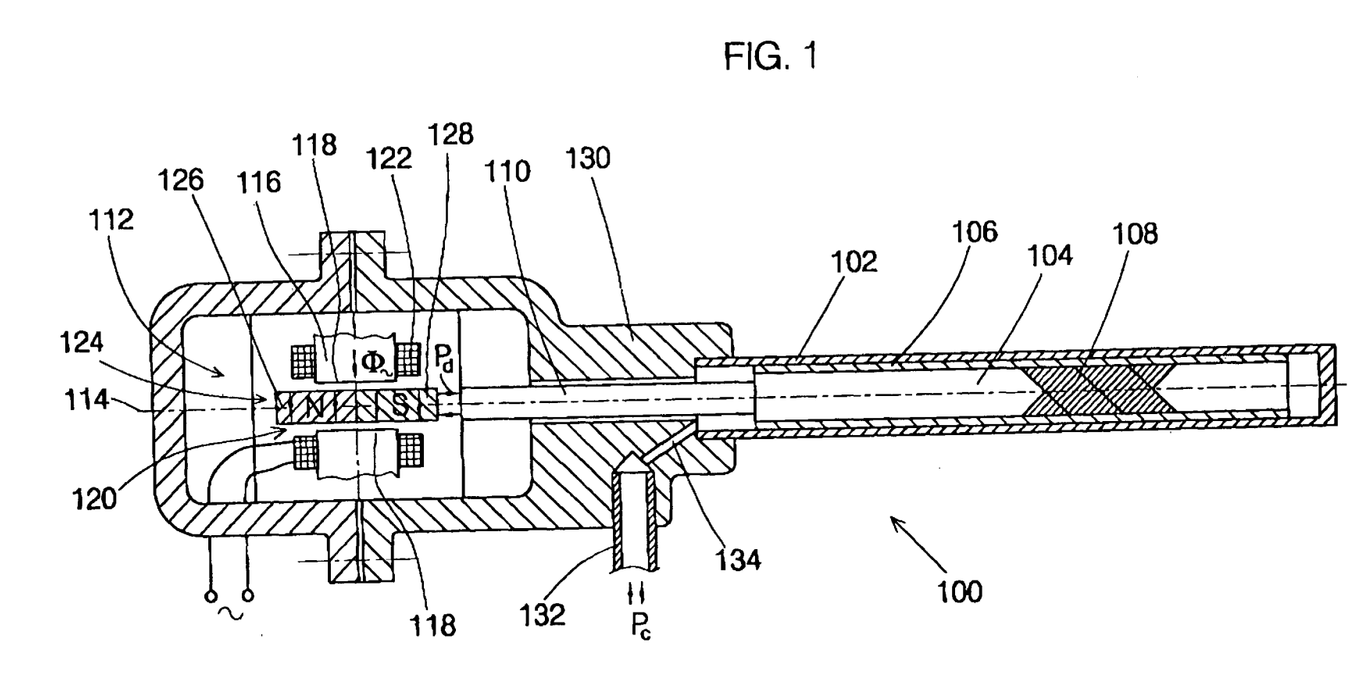
FIG. 1 is a cross-sectional view of a displacer assembly, constructed and operative according to the teachings of the present invention, for use in a Stirling cycle system.

Referring now to the drawings, FIG. 1 shows a displacer assembly, generally designated 100, constructed and operative according to the teachings of the present invention, for use in a Stirling cycle system. Displacer assembly 100 may be used to advantage with any type of compressor to construct a Stirling cycle system. However, in a preferred embodiment of a Stirling cycle system according to the present invention, a synchronous twin reciprocating piston compressor apparatus is used. Such a compressor, the subject of related co-pending U.S. patent application Ser. No. 08/599,206 filed Feb. 9, 1996, issued on Dec. 2, 1997, as U.S. Pat. No. 5,693,991 and hereby incorporated in its entirety by reference, will be described below with reference to FIGS. 2–11.

Generally speaking, displacer assembly 100 includes a displacer 102 in the form of a hollow cylinder along which a regenerator 104 travels. Regenerator 104 is constructed to function as a heat exchanger, by way of example shown here as a thin-walled cylinder 106 containing numerous metal screens 108 forming a cylindrical matrix.

Operatively connected to displacer 102 via a drive rod 110 is a synchronous linear electric motor 112. It is a particular feature of motor 112 that its construction is designed to provide a magnetic spring such that, when no power is supplied to the motor, displacer 102 returns to a predefined rest position.

It should be noted in this context that, when reference is made to the position of the "displacer", this is to be understood to refer to the position of the movable component of the displacer, in this case, regenerator 104.

Turning now to the features of displacer assembly 100 in more detail, a preferred structure for motor 112 is described with reference to an axis of movement 114. Preferably, axis 114 is collinear with the axis of displacer 102, although a non-collinear mechanical link could alternatively be employed.

Preferably, motor 112 includes at least one stator assembly 116 having a core which provides first and second pole pieces 118 defining therebetween a gap 120. Pole pieces 118 are made from soft magnetic material and are deployed such that a dimension referred to as the "width" of gap 120, corresponding to the line of shortest distance between the two pole pieces, is oriented perpendicular to axis 114. Stator assembly 116 also includes at least one coil 122 associated with the core so as to generate a magnetic field aligned primarily parallel to the width of gap 120.

Located within gap 120 is at least one compound permanent magnet system 124. Compound permanent magnet system 124 includes a first section 126 magnetized in a first direction parallel to the width of gap 120 and a second section 128 axially displaced from first section 126 and magnetized in a direction opposite to the first direction. First and second sections 126 and 128 may be directly adjacent, i.e., forming a butt-joint therebetween. Alternatively, they may be slightly axially spaced apart.

The motor structure described here provides a number of advantages over the structure of Davey mentioned above. Most notably, in the absence of an applied current, motor 112 functions as a non-contact magnetic spring, returning and retaining the displacer in a desired rest position. This self-centering effect stems from the well defined lowest energy position of compound permanent magnet system 124 in which maximum magnetic flux closure occurs through the soft magnetic material of pole pieces 118. As a result, mechanical spring elements with their accompanying problems of efficiency and reliability can be omitted altogether from the displacer assembly design.

A further advantage of the motor structure described is that the fixed coil configuration avoids problems of sliding electrical contacts. The compound magnet motor configuration also provides particularly high efficiency.

It should be appreciated that the illustration of motor 112 shown here is schematic in nature. Although a single axially-placed magnet system 124 may be used, the motor structure is not limited to such a configuration. Other possible implementations include, but are not limited to, cylindrical and polygonal-section magnet systems similar to those described below in the context of the compressor structure.

To complete the description of FIG. 1, motor 112 is preferably mounted in fixed relation to the outer cylinder of displacer 102 through a common housing 130. Housing 130 typically features a linear bearing and a dynamic seal around drive rod 110. Connection between displacer 102 and a compressor to construct a Stirling cycle system is achieved via a gas inlet pipe 132 and connection tube 134.

As mentioned earlier, displacer assembly 100 can be used to advantage with any compressor design. Synchronization, amplitude control, and emulation of various mechanical damping effects can all be achieved by electronic control of a source of oscillating current and the associated circuitry. Preferably, synchronization between the compressor and displacer is ensured by using a common oscillatory source for both, phase adjustment being performed either by use of additional components with suitable impedances or by other digital or analogue methods.

Preferably, displacer assembly 100 is used with a compressor driven by a motor of which the design shares similar properties to those of motor 112 described above. Various examples of such compressors will now be described.

Figure 2:
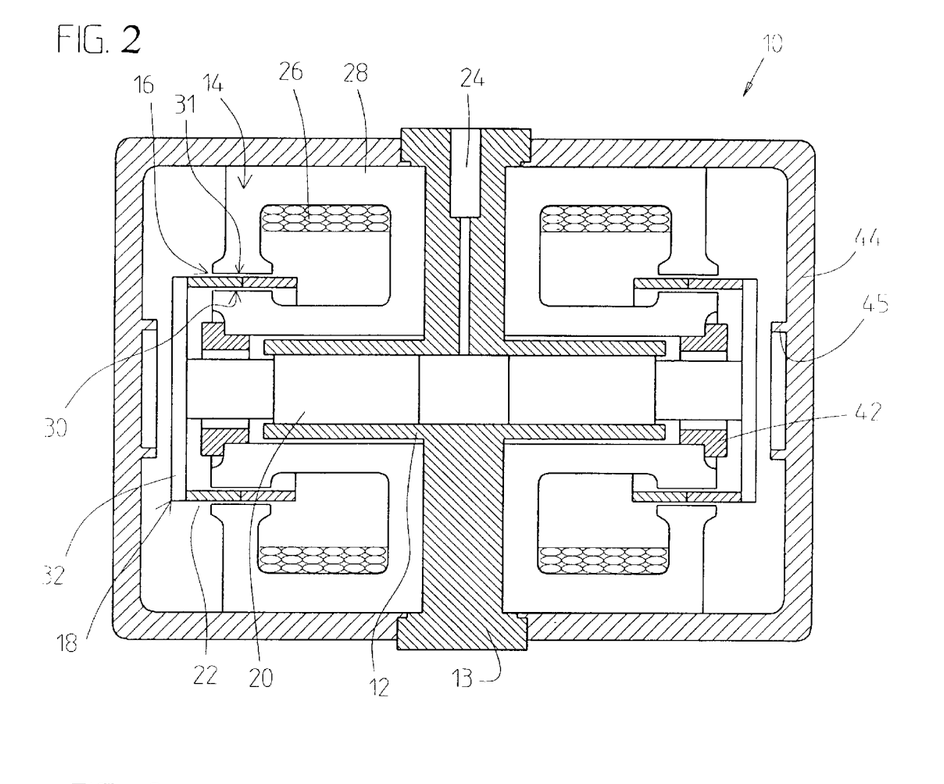
FIG. 2 is a side cross-sectional view through a synchronous twin reciprocating piston compressor apparatus, constructed and operative according to the teachings of the present invention, for use with the displacer assembly of FIG. 1 to form a Stirling cycle system.

Referring now to the preferred compressor structure, FIG. 2 shows a compressor, generally designated 10, constructed and operative according to the teachings of the present invention. In general terms, compressor 10 includes a cylinder 12, two identical stator assemblies 14 fixed relative to cylinder 12 for producing a concentrated alternating radial magnetic field in regions 16, and a pair of piston-magnet assemblies 18. Each piston-magnet assembly 18 includes a piston 20 slidable within part of cylinder 12 and a number of compound permanent magnet systems 22 located within regions 16. When stator assemblies 14 are excited by an alternating current, alternating axial forces are exerted on compound permanent magnet systems 22 thereby causing synchronous opposing reciprocation of pistons 20 within cylinder 12. The reciprocation of pistons 20 within cylinder 12 gives rise to oscillating pressure at the center of cylinder 12.

In the interest of clarity, it should be understood that the term "axial" as used herein in the specification and claims refers to a direction of dimension which is parallel to the central axis of cylinder 12. Similarly, the term "radial" is used herein in the specification and claims to refer to a direction or dimension perpendicular to this axis.

Although the present invention is described herein as a single cylinder structure, it may readily be adapted to a multiple cylinder system. A number of synchronous systems functioning in parallel may be connected at their outlets. Alternatively, a number of cylinders may be combined into a single unit with a plurality of angularly-spaced interconnected bores each receiving a pair of opposing pistons-magnet assemblies.

Turning now to the features of compressor 10 in more detail, cylinder 12 has an internal bore which is ground to high precision for receiving pistons 20. An outlet tube 24 is connected to the inner volume of cylinder 12 near its center. For pumping applications in which a net flow is required, an additional inlet tube and appropriately positioned valves (not shown) may be added.

It is an important feature of the compressors of the present invention that the cylinder 12, stator assemblies 14 and piston-magnet assemblies 18 are arranged precisely coaxially. To facilitate precise alignment of stator assemblies 14 relative to cylinder 12, compressor 10 features a radially extending flange 13 integrally formed with cylinder 12 at the center of its length.

Turning now to stator assemblies 14, each stator assembly includes at least one coil 26 and a core made up of one or more pairs of stator packs 28 arranged symmetrically about the axis of cylinder 12. Independent stator assemblies 14 are preferably provided for driving each piston-magnet assembly 18. Each stator assembly 14 is attached to flange 13. Alternatively, stator assembly 14 may extend along a major part of the length of cylinder 12 to provide regions 16 around both ends of cylinder 12, as will be illustrated below with reference to FIG. 9.

Figure 3:
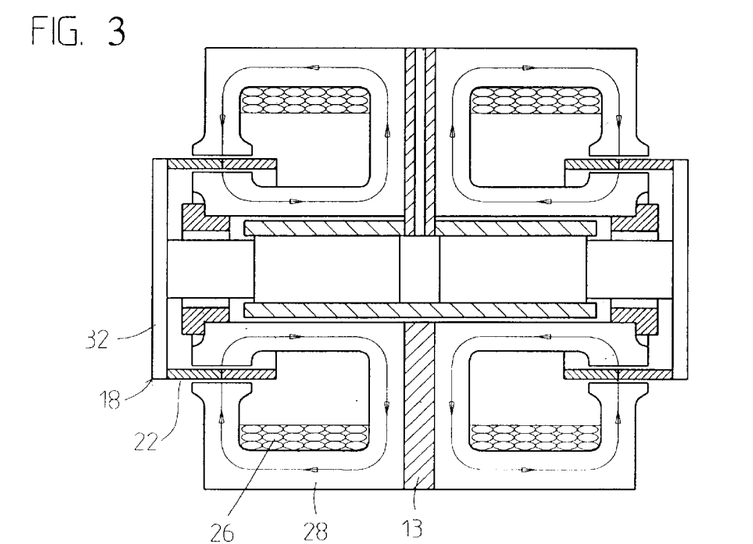
FIG. 3 is a schematic side cross-sectional view showing the magnetic flux patterns during operation of the apparatus of FIG. 2.

It is a particular feature of the present invention that stator assemblies 14 produce a substantially radial magnetic field pattern concentrated within regions 16. To achieve this result, stator packs 28 are generally shaped as substantially closed magnetic circuits which pass through coil 26. Regions 16 are defined by relatively narrow breaks in stator packs 28 formed between gap faces 30 and 31. The magnetic flux patterns corresponding to the view of FIG. 2 are shown in FIG. 3.

Figure 4A:
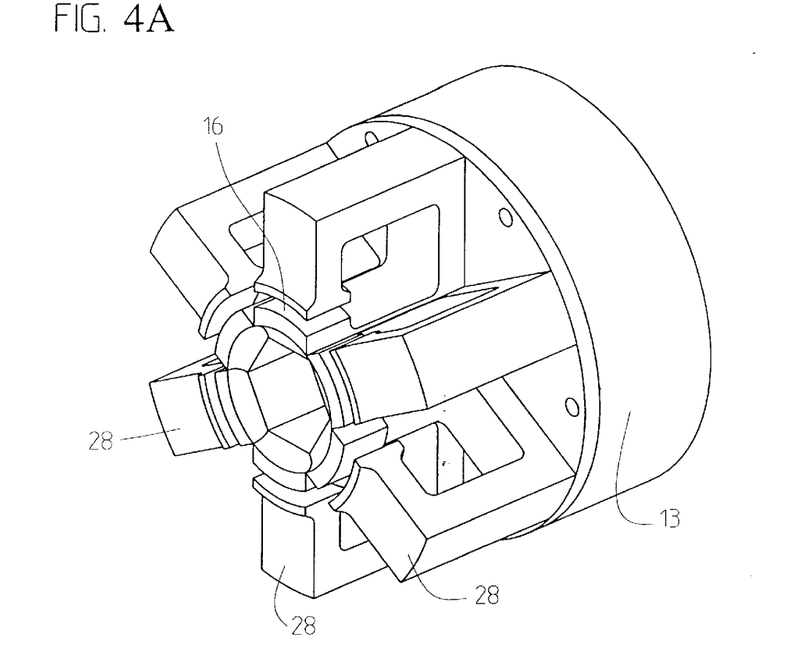
FIG. 4A is a schematic perspective view of a core of a stator assembly for use in the apparatus of FIG. 2.
Figure 4B:
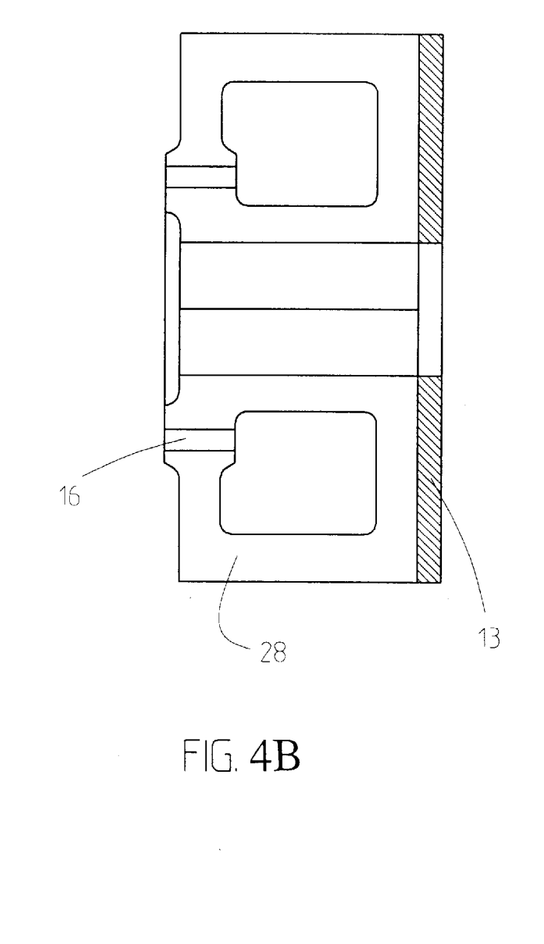
FIG. 4B is a side cross-sectional view through the stator core of FIG. 4A.
Figure 4C:
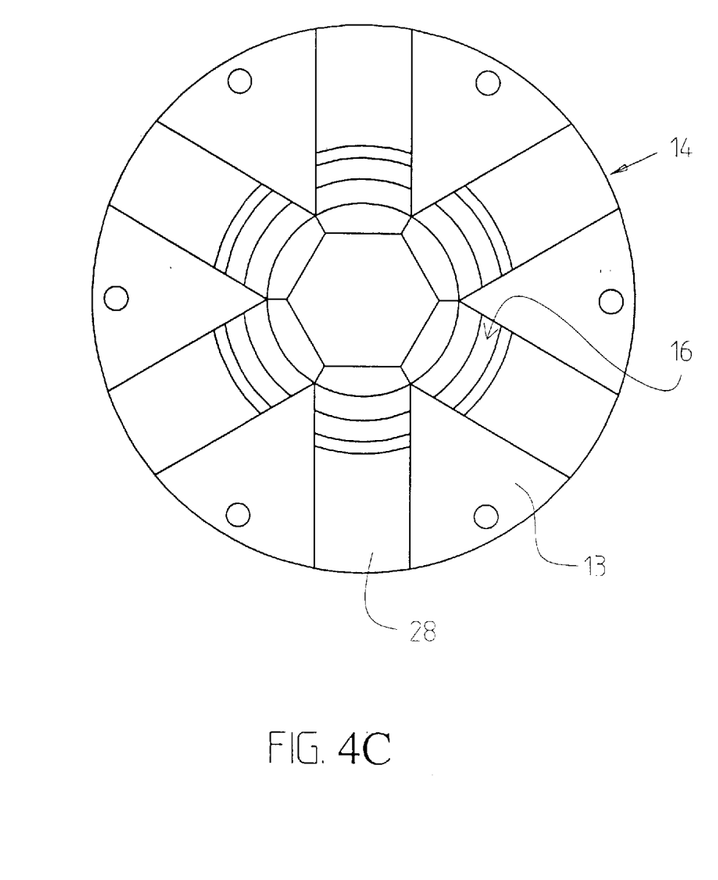
FIG. 4C is an end view of the stator core of FIG. 4A.

In a preferred embodiment, three pairs of stator packs 28 are arranged with hexagonal symmetry about the axis of cylinder 12, as shown in FIGS. 4A, 4B and 4C. Stator packs 28 are preferably constructed from a plurality of laminations parallel to the magnetic flux direction, thereby minimizing the magnetic losses.

Gap faces 30 and 31 are shaped to match the shape of compound permanent magnet systems 22. Thus, they are typically curved to match a cylindrical magnet design which will be described below with reference to FIG. 6A. Alternatively, parallel planar gap faces 30 and 31 may be used to match a polygon-structured compound permanent magnet system, as will be described below with reference to FIG. 6B.

Coils 26 and stator packs 28 are constructed to produce magnetic fields of equal magnitude, up to given tolerances, in each region 16. Thus, where separate coils 26 are used to generate the fields at the two ends of cylinder 12, similar coils of equal numbers of Ampere-turns are used. Similarly, stator packs 28 are designed and positioned symmetrically relative to both to rotation about the axis of cylinder 12, and reflection in a plane perpendicular thereto. In practice, the symmetry of the magnetic fields produced is limited by the tolerances of the components used. Mechanisms for compensating for distortion of the magnetic fields will be discussed below.

It is generally advantageous to provide independent and reversible connections (not shown) for connecting coils 26 to a power supply (not shown). This allows construction of piston-magnet assemblies 18 without requiring unique determination of the polarity of each magnet used. A polarity checking procedure may then be performed to determine whether the arrangement of magnets used generates the required opposing piston motion, and if necessary, the polarity of one of coils 26 may be reversed. The polarity checking procedure will be described below. It may also be desirable to enable switching between parallel and series connection of coils 26.

Figure 5A:
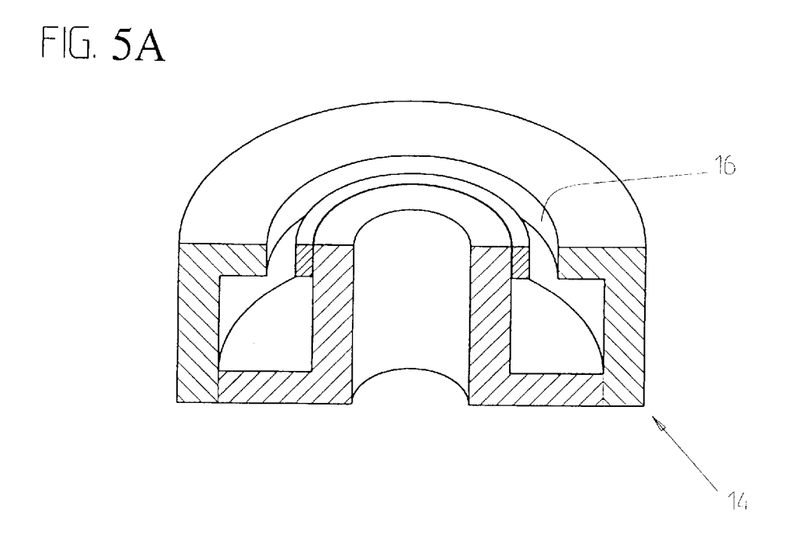
FIG. 5A is a cut-away perspective view of a first alternative stator core structure produced from ferrite.
Figure 5B:
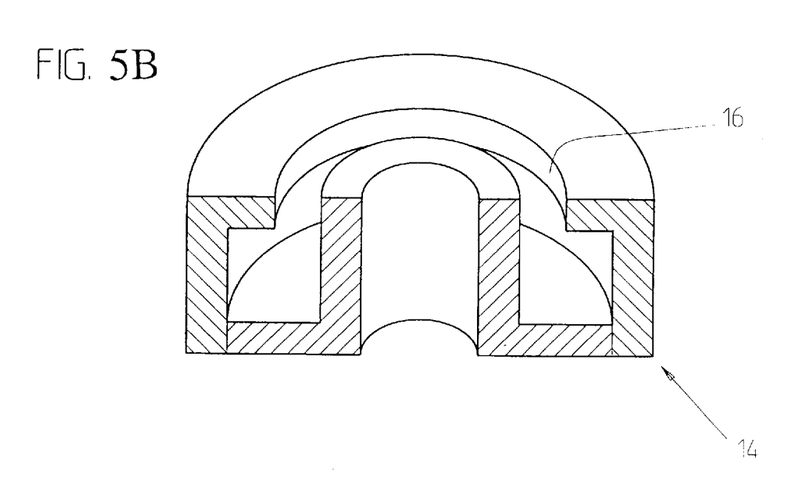
FIG. 5B is a cut-away perspective view of a second alternative stator core structure produced from ferrite.

As an alternative to the laminated stator structure described above, the cores of stator assemblies 14 may be constructed from Ferrite in a manner known in the art. The use of Ferrite for stator assemblies 14 makes possible additional stator structures. For example, stators assemblies 14 may be constructed as a solid of revolution of any of the disclosed stator cross-sections, thereby generating magnetic fields within a region 16 with circular symmetry. In order to facilitate assembly of stator assemblies 14, the ferrite core is typically made from two or more sections which are then fixed together. FIG. 5A shows an example in which a three-piece structure is used. FIG. 5B shows a simplified two-piece construction.

Figure 6A:
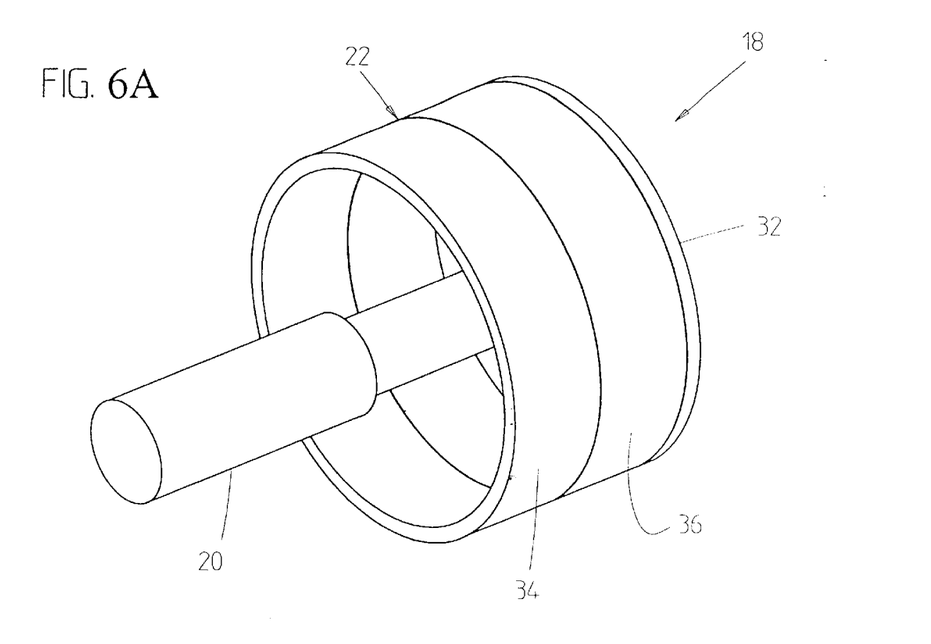
FIG. 6A is a schematic perspective view of a piston-magnet assembly for use in the apparatus of FIG. 2, the assembly including a compound permanent magnet system.
Figure 7A:
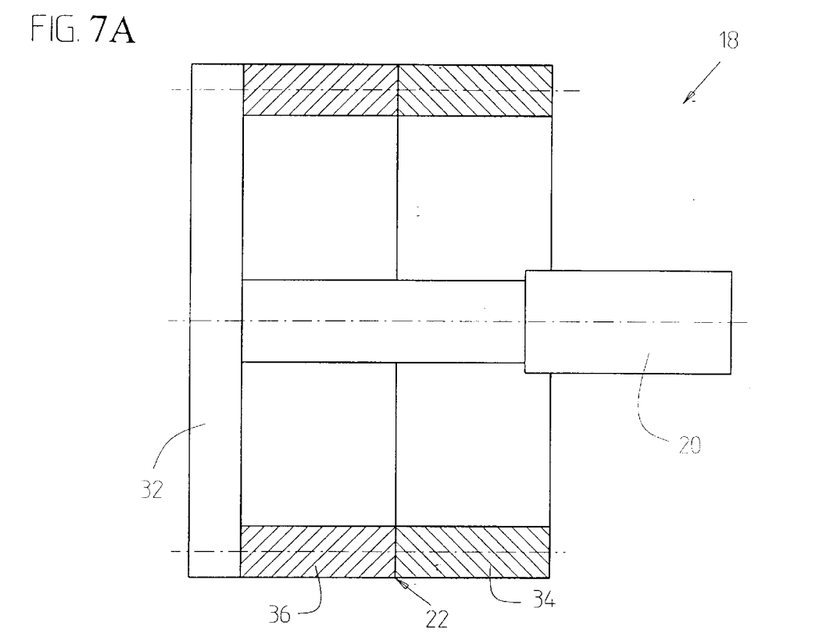
FIG. 7A is a schematic side cross-sectional view through the piston-magnet assembly of FIG. 6A.

Turning now to the features of piston-magnet assembly 18, this is shown most clearly in FIGS. 6A and 7A. Piston-magnet assembly 18 includes piston 20 and compound permanent magnet systems 22 connected through a cap 32.

Piston 20 is preferably machined to match the internal bore of cylinder 12 with a clearance of at least a few μm (typically about 8–30 μm). The material for piston 20 is chosen based on mechanical considerations alone, since the magnetic character of piston 20 is not important. Piston 20 is therefore typically made from a hardened low-friction material. Piston 20 may alternatively be constructed from a soft, light-weight material such as, for example, aluminum, and then coated with appropriate coatings, as is known in the art.

Compound permanent magnet system 22 is made up of a first section 34 magnetized with its direction of magnetization radial relative to the axis of cylinder 12, and a second section 36, adjacent to, and axially displaced from first section 34, magnetized with its direction of magnetization opposite to that of first section 34. First and second sections 34 and 36 are generally produced separately and then attached by any suitable type of bonding.

Figure 6B:
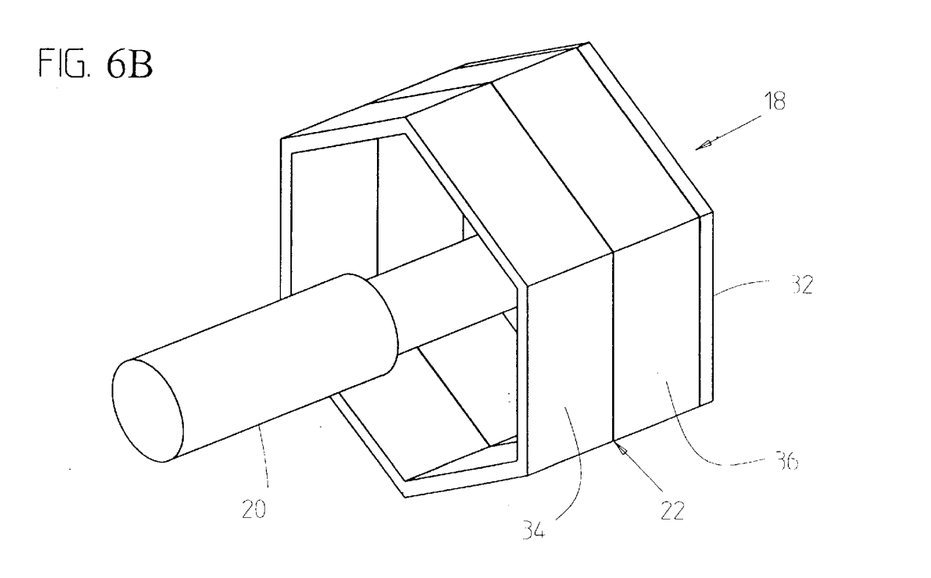
FIG. 6B is a schematic perspective view of an alternative piston-magnet assembly for use in the apparatus of FIG. 2.

In a preferred embodiment, first and second sections 34 and 36 are radially magnetized cylindrical magnets as shown in FIG. 6A. Alternatively, each section may be made up of a number of planar permanent magnets mounted together so as to form a regular polygon as shown in FIG. 6B. In both cases, first and second sections 34 and 36 are closed structures symmetrical about their axis, thereby providing the structural rigidity required for precise alignment. Of course, gap faces 30 and 31 of stator packs 28 are shaped to match the shape of compound permanent magnet system 22 with a clearance of about 0.1–1 mm between compound permanent magnet system 22 and each gap face 30 and 31.

Figure 7B:
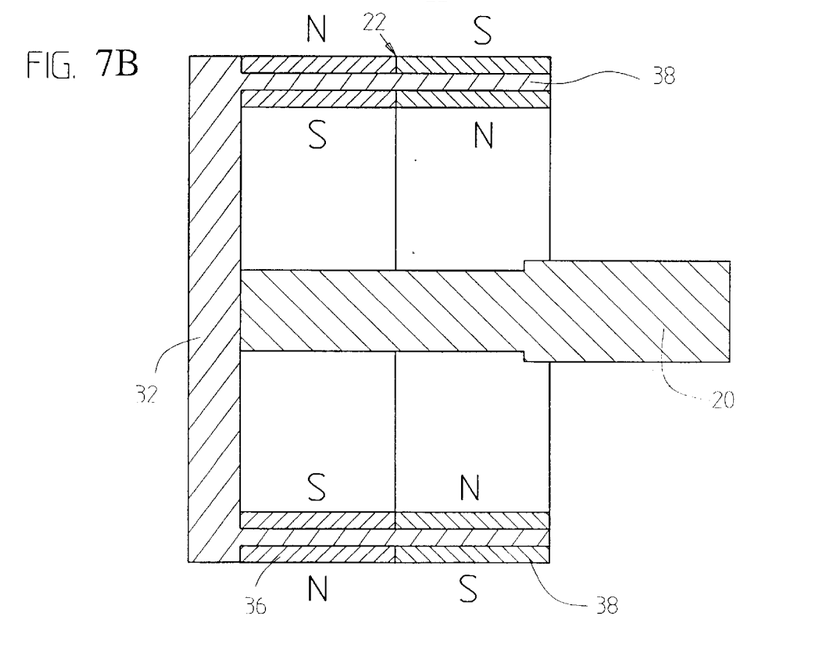
FIG. 7B is a view similar to FIG. 7A showing an alternative compound permanent magnet system structure.

FIG. 7B shows an alternative construction for the piston-magnet assemblies of FIGS. 6A and 6B. In this construction, a layer 38 of magnetically conductive material, integrally formed with cap 32, forms a core on which compound permanent magnet system 22 is constructed. Layer 38 may also be integrally formed with piston 20. First section 34 and second section 36 are each then formed by attachment of suitably magnetized permanent magnets on to the inner and outer faces of layer 38.

The use of layer 38 integrally formed with cap 32 provides additional structural rigidity and help to ensure proper alignment of the magnets with piston 20.

Layer 38 is formed as a hollow tube of a cross-sectional shape matching the required shape of compound permanent magnet system 22. For the form shown in FIG. 6A, the cross-section will be circular, and for the form shown in FIG. 6B, it will be the corresponding polygon.

When compressor 10 is assembled, stator assembly 14 is mounted in fixed relation around cylinder 12 such that it provides a plurality of regions 16 arranged symmetrically near each end of cylinder 12. Piston-magnet assemblies 18 are the positioned at each end of cylinder 12 with pistons 20 inserted within the bore of cylinder 2 and compound permanent magnet systems 22 inserted within regions 16. Inner stops 42 attached to stator packs 28 limit the range of sliding motion of piston-magnet assemblies 18, thereby preventing collision of pistons 20. Compressor 10 generally also features a casing 44 which provides support and rigidity to the entire structure. Outer stops 45, attached to casing 44, prevent piston-magnet assemblies 18 from overshooting outward from their normal range of working positions. Stops 42 and 45 are preferably made of resilient material such as, for example, natural or synthetic rubber.

It is a preferred feature of the present invention that the clearance gaps between gap faces 30, 31 and compound permanent magnet systems 22 are significantly greater, and typically one or two orders of magnitude greater, than the clearance gaps between pistons 20 and the internal bore of cylinder 12. This feature ensures effective pumping operation while protecting the mechanically soft magnetic components of compressor 10 from unnecessary wear. The clearance gaps between gap faces 30, 31 and compound permanent magnet systems 22 should not be increased beyond the extent required for protection from wear since the resultant widening of regions 16 would cause weakening of the magnetic field.

Turning now to the operation of compressor 10, when coils 2 are excited by alternating current, alternating substantially radial magnetic fields are generated within regions 16. As the magnetic field increases in a first direction, the section 34 of compound permanent magnet system 22 which is magnetized in alignment with the field tries to align centrally in the field, and the section 36 which is magnetized in the opposing sense is repelled. The net result of these forces is a purely axial force on each compound permanent magnet system 22 which is transferred through cap 32 to piston 20. When the magnetic field is reversed, the forces are reversed, thereby forcing piston 20 in the opposite direction. Thus, the alternating current supply causes compound permanent magnet systems 22, and hence piston 20, to reciprocate axially.

It should be noted that compressor 10 does not require the springs invariable featured in conventional linear compressors. Due to the opposing-poles structure of compound permanent magnet systems 22, piston-magnet assemblies 18 will naturally tend to a centered resting position in the absence of current in coils 26.

As mentioned above, coils 26 are preferably provided with independent electrical connections with switchable polarity. This feature allows construction of piston-magnet assemblies 18 without requiring unique determination of the polarity of each magnet used. Then, before use of compressor 10, a polarity checking procedure is performed. The polarity checking procedure requires applying a non-alternating (D.C.) voltage across the coils and observing the direction of displacement of both piston-magnet assemblies. If both are drawn inwards towards cylinder 12, or alternatively, both move outwards away from the cylinder, then it is clear that the connection of the coils is correct for the polarity of the magnets. If, on the other hand, one piston-magnet assembly moves inwards and the other outwards, the polarity of one of coils 26 is reversed.

Figure 8:
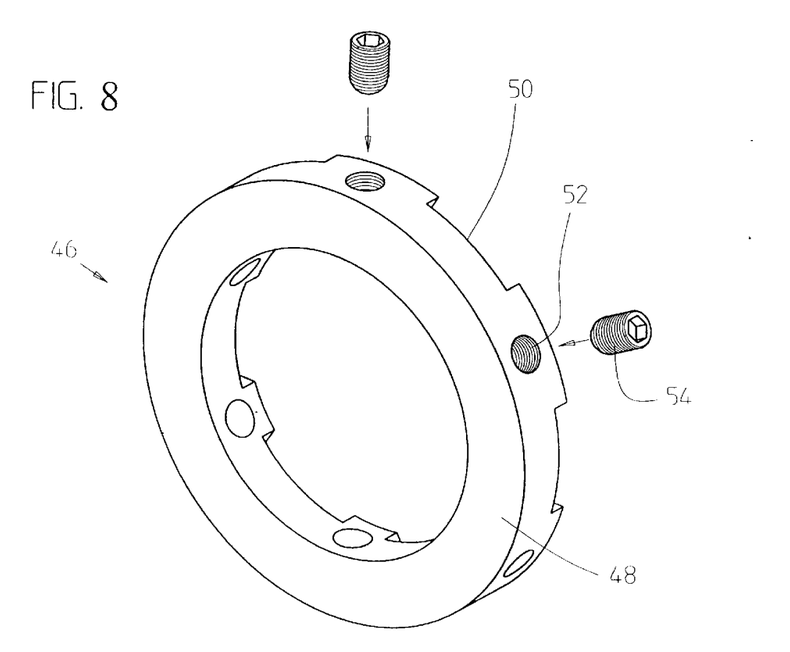
FIG. 8 is a schematic perspective view of a magnetic compensation mechanism for use in the apparatus of FIG. 2.

With reference to FIG. 8, additional preferred features of compressor 10 for compensating for distortions of the magnetic fields will now be described. As mentioned above, variations inherent to the materials from which components of compressor 10 are made, and the tolerances to which they are produced, may cause distortions of symmetry of the magnetic fields generated in regions 16. These distortions may result in slight non-compensated radial forces which would cause additional frictional energy losses, as well as increased wear on piston 20.

It is therefore a preferred feature of the present invention that compressor 10 features a magnetic compensation mechanism for modifying the magnetic fields so as to minimize frictional power losses and vibration in compressor 10 during operation.

FIG. 8 shows an example of a magnetic compensation mechanism, generally designated 46, for modifying the magnetic fields in regions 16. Mechanism 16 includes a collar 48 formed with recesses 50 for engaging parts of stator assemblies 14 (as seen in FIG. 4A) and threaded radial bores 52. A number of inserts 54 made from soft magnetic material are formed as threaded pins which fit radial bores 52. One example of a material suitable for producing inserts 54 is the material commercially available under the tradename "Carpenter 49".

When collar 48 is positioned on stator packs 28 and inserts 54 are located in radial bores 52, the ends of each insert 54 is held near two compound permanent magnet systems 22. In this position, rotation of insert 54 relative to the thread of radial bore 52 causes adjustment of the radial position of insert 54, and hence of its distance from regions 16. The variable proximity of the soft magnetic material of inserts 54 to compound permanent magnet systems 22 may then be used to modify the magnetic field patterns in regions 16 while compressor 10 is in operation until frictional losses and vibration in compressor 10 are minimized.

Practically, an effective method of optimizing the performance of compressor 10 using magnetic compensation mechanism 46 is by adjusting inserts 56 to achieve minimum power consumption. This is done by activating compressor 10 with a given alternating voltage and monitoring the current drawn. Inserts 56 are then adjusted simultaneously, or alternately, until the current is at a global minimum.

As an alternative to the magnetic compensation mechanism described above with reference to FIG. 8, additional windings (not shown) may be located around individual stator packs 28 and be supplied selectively with a D.C. current. A rheostat or other current control device is used to vary the current through the additional windings of one or more of stator packs 28. This has an effect analogous to adjustment of inserts 56 in magnetic compensation mechanism 46, and is used to balance radial forces in a manner similar to that described above.

Figure 9:
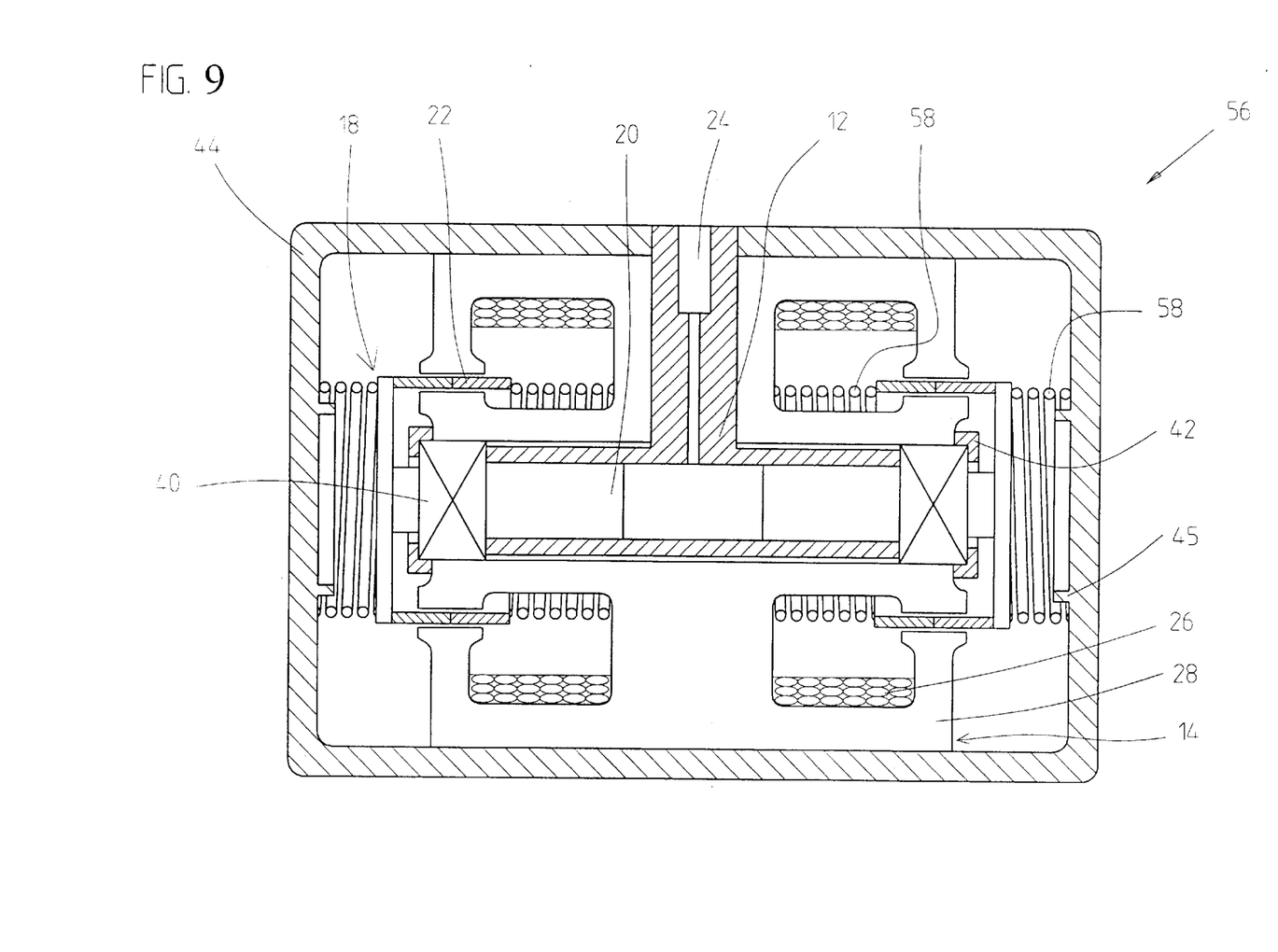
FIG. 9 is a side cross-sectional view through a variant form of the apparatus of FIG. 2.
Figure 10A:
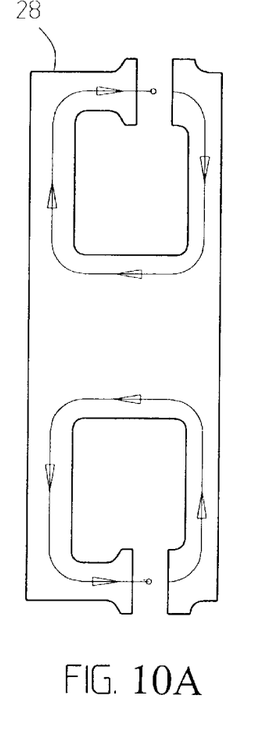
FIG. 10A is a side cross-sectional view through a form of stator core used in the apparatus of FIG. 9.
Figure 10B:
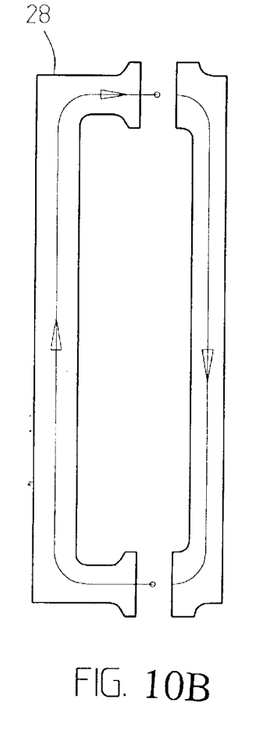
FIG. 10B is a side cross-sectional view through an alternative form of stator core for use in the apparatus of FIG. 9.
Figure 11A:
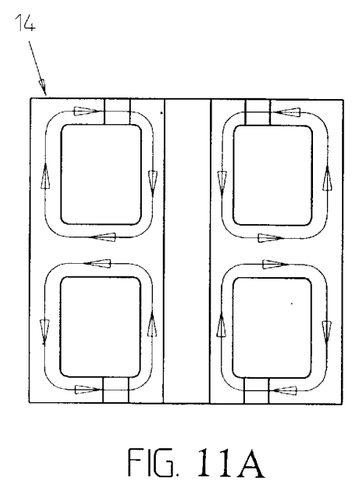
FIGS. 11A and 11B are side cross-sectional views showing the magnetic flux patterns generated by the forms of stator shown in FIGS. 10A and 10B, respectively.
Figure 11B:
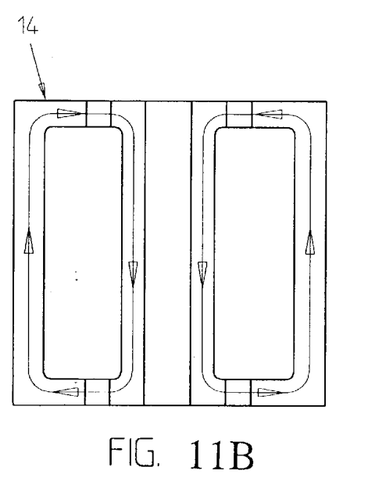

With reference to FIG. 9, a variant form of a compressor, generally designated 56, constructed and operative according to the teachings of the present invention, will now be described. Compressor 56 is generally similar to compressor 10, and equivalent elements are labeled similarly. In this case, stator assemblies 14 are elongated so as to provide the required magnetic fields in regions 16 at both ends of cylinder 12. FIGS. 10A and 10B show two possible forms for stator packs 28 in this embodiment. FIGS. 11A and 11B show the magnetic flux patterns corresponding to the forms of FIGS. 10A and 10B, respectively.

A further difference between compressor 56 and compressor 10 is the provision in compressor 56 of a spring 58. As was described above, piston-magnet assemblies 18 are self-centering without the need for springs. However, in certain circumstances it is preferable to include springs 58, as shown. Springs 58 provide additional biasing of piston-magnet assemblies 18 towards their central position, and increase the stability of the system in sub-resonance conditions.

It should also be noted that a linear bearing 40, not present in compressor 10, is included in compressor 56. Linear bearing 40 helps to maintain the highly precise alignment required between piston-magnet assemblies 18 and cylinder 12. Linear bearing 40 may be attached directly to cylinder 12, or fixed in alignment with it through attachment to stator packs 28 or to another part of compressor 10 which is fixed relative to cylinder 12.

Figure 12:
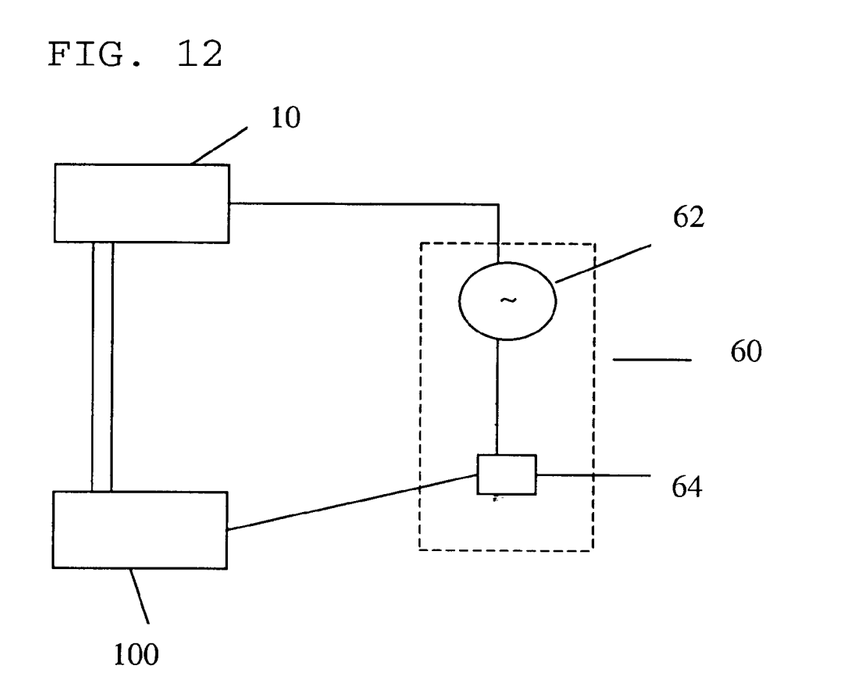
FIG. 12 is a schematic representation of a Stirling cycle system including the displacer assembly of FIG. 1 and the compressor apparatus of FIG. 2.

Finally, with reference to FIG. 12, a schematic representation of a Stirling cycle system, constructed and operative according to the teachings of the present invention, is shown. The system employs a displacer assembly 100 together with a compressor 10. By way of example, to ensure synchronicity of the two elements, a control system 60 is provided. In a simplest implementation, control system 60 includes an AC voltage source 62 and a phase-altering device 64. One element, in this case compressor 10, is connected directly to the voltage source 62 while the other, in this case displacer assembly 100, is connected via phase-altering device 64. Since the two outputs provided by control system 60 are synchronous but out of phase, the required synchronicity of the compressor motor and displacer motor is ensured.

As mentioned earlier, phase-altering device 64 may perform phase adjustment either by use of additional components with suitable impedances or by other digital or analogue methods. In addition, various elements may be included to provide the equivalent of viscous friction retardation or other mechanical effects. Clearly, voltage source 62 and phase-altering device 64 may be implemented as separate units, referred to collectively as the control system, or may be combined into a single control unit.

It will be appreciated that the above descriptions are intended only to serve as examples, and that many other embodiments are possible within the spirit and the scope of the present invention.

What is claimed is:

1. A displacer assembly for a Stirling cycle system comprising:
   (a) a displacer; and
   (b) a synchronous linear electric motor operatively connected so as to drive said displacer, said electric motor having an axis of movement, said electric motor including:
      (i) at least one stator assembly having first and second soft-magnetic pole pieces defining therebetween a gap, a width of said gap being oriented perpendicular to said axis, said stator assembly being constructed so as to generate a magnetic field aligned primarily parallel to said width of said gap, and
      (ii) at least one compound permanent magnet system located within said gap, said compound permanent magnet system including a first section magnetized in a first direction parallel to said width of said gap and a second section axially displaced from said first section magnetized in a direction opposite to said first direction,
   said electric motor operating as a magnetic spring which, when no power is supplied to said motor, returns said displacer to a predefined rest position.

2. The displacer assembly of claim 1, wherein said stator assembly includes a coil, variation of a voltage applied to said coil resulting in a corresponding variation in an axial force between said stator assembly and said compound permanent magnet system.

3. A Stirling cycle system comprising:
   (a) the displacer assembly of claim 1;
   (b) a compressor; and
   (c) a voltage source,
   wherein said electric motor is referred to as the "displacer motor", and wherein said compressor includes at least one synchronous electric motor referred to as the "compressor motor", both said displacer motor and said compressor motor being operatively connected so as to be driven by said voltage source.

4. A Stirling cycle system comprising:
   (a) a compressor;
   (b) a displacer; and
   (c) a synchronous linear electric motor operatively connected so as to drive said displacer,
   wherein said electric motor is constructed so as to provide a magnetic spring such that, when no power is supplied to said motor, said displacer returns to a predefined rest position.

5. The system of claim 4, wherein said electric motor has an axis of movement, said electric motor including:
   (a) at least one stator assembly having first and second soft-magnetic pole pieces defining therebetween a gap, a width of said gap being oriented perpendicular to said axis, said stator assembly being constructed so as to generate a magnetic field aligned primarily parallel to said width of said gap; and
   (b) at least one compound permanent magnet system located within said gap, said compound permanent magnet system including a first section magnetized in a first direction parallel to said width of said gap and a second section axially displaced from said first section magnetized in a direction opposite to said first direction.

6. The system of claim 5, wherein said electric motor is referred to as the "displacer motor", and wherein said compressor includes at least one synchronous linear electric motor, referred to as the "compressor motor", said compressor motor being constructed so as to provide a magnetic spring such that, when no power is supplied to said compressor motor, said compressor returns to a predefined rest state.

7. The system of claim 6, wherein said compressor motor has an axis of movement, said compressor motor including:
   (a) at least one stator assembly having first and second soft-magnetic pole pieces defining therebetween a gap, a width of said gap being oriented perpendicular to said axis, said stator assembly being constructed so as to generate a magnetic field aligned primarily parallel to said width of said gap; and
   (b) at least one compound permanent magnet system located within said gap, said compound permanent magnet system including a first section magnetized in a first direction parallel to said width of said gap and a second section axially displaced from said first section magnetized in a direction opposite to said first direction.

8. The system of claim 4, wherein said electric motor is referred to as the "displacer motor", and wherein said compressor includes at least one synchronous electric motor, referred to as the "compressor motor", the system further comprising a voltage source, both said displacer motor and said compressor motor being operatively connected so as to be driven by said voltage source.

9. The system of claim 8, further comprising at least one element with variable impedance connected between said voltage source and one of said displacer motor and said compressor motor for adjusting the relative phase between said compressor and said displacer.

10. A displacer assembly for a Stirling cycle system comprising:
   (a) a displacer; and
   (b) a synchronous linear electric motor operatively connected so as to drive said displacer, said electric motor having an axis of movement, said electric motor including:
      (i) at least one stator assembly defining a pole gap and configured to generate a substantially uniform primary magnetic field within said gap aligned substantially solely perpendicular to said axis of movement, and
      (ii) at least one movable magnet system located within said gap,
   said electric motor operating as a magnetic spring which, when no power is supplied to said motor, returns said displacer to a predefined rest position.

11. A displacer assembly for a Stirling cycle system comprising:
   (a) a displacer; and
   (b) a synchronous linear electric motor operatively connected so as to drive said displacer, said electric motor having an axis of movement, said electric motor including:
      (i) at least one stator assembly having a single magnetic circuit such that, at any moment, said stator assembly provides a single north magnetic pole and a single south magnetic pole defining therebetween a gap, and
      (ii) at least one compound magnet system located within said gap, said compound magnet system including two magnets connected together,
   said electric motor operating as a magnetic spring which, when no power is supplied to said motor, returns said displacer to a predefined rest position.

12. A displacer assembly for a Stirling cycle system comprising:

(a) a displacer; and (b) a synchronous linear electric motor operatively connected so as to drive said displacer, said electric motor having an axis of movement, said electric motor including:

(i) at least one stator assembly having pole pieces defining therebetween a gap, and (ii) at least one compound permanent magnet system located within said gap, said compound permanent magnet system including a first section magnetized in a first direction perpendicular to said axis of movement and a second section, axially displaced from said first section, magnetized in a direction opposite to said first direction.

* * * * *